United States Patent
Yoo et al.

(10) Patent No.: US 10,119,536 B2
(45) Date of Patent: Nov. 6, 2018

(54) COMPRESSOR CONTROL APPARATUS AND CONTROL METHOD

(71) Applicant: LG ELECTRONICS INC., Seoul (KR)

(72) Inventors: Jaeyoo Yoo, Seoul (KR); Sungho Park, Seoul (KR); Gyunam Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/519,919

(22) PCT Filed: Nov. 2, 2015

(86) PCT No.: PCT/KR2015/011648
§ 371 (c)(1),
(2) Date: Apr. 18, 2017

(87) PCT Pub. No.: WO2016/068675
PCT Pub. Date: May 6, 2016

(65) Prior Publication Data
US 2017/0335839 A1    Nov. 23, 2017

(30) Foreign Application Priority Data

Oct. 31, 2014    (KR) .......................... 10-2014-0150495

(51) Int. Cl.
*H02K 33/00*     (2006.01)
*F04B 49/06*     (2006.01)
(Continued)

(52) U.S. Cl.
CPC .............. *F04B 49/06* (2013.01); *F04B 35/04* (2013.01); *H02M 1/14* (2013.01); *H02M 5/4585* (2013.01);
(Continued)

(58) Field of Classification Search
CPC .............. Y02B 70/126; H02M 1/4225; H02M 2001/007; H02M 1/4208; H02M 7/06
See application file for complete search history.

(56) References Cited

U.S. PATENT DOCUMENTS

| | | | |
|---|---|---|---|
| 2003/0164691 A1 | 9/2003 | Ueda et al. | |
| 2006/0033457 A1* | 2/2006 | Won | H02P 6/34 318/400.23 |

(Continued)

FOREIGN PATENT DOCUMENTS

| | | | |
|---|---|---|---|
| EP | 2 184 842 | | 5/2010 |
| KR | 10-2007-018398 | * | 4/2009 |

(Continued)

OTHER PUBLICATIONS

Translation of KR 10-2007-018398 has been attached.*

(Continued)

*Primary Examiner* — Shawki S Ismail
*Assistant Examiner* — Zoheb Imtiaz
(74) *Attorney, Agent, or Firm* — Ked & Associates LLP

(57) ABSTRACT

A compressor control apparatus includes a rectifying unit configured to rectify power applied from the outside, a DC link unit configured to include a pair of capacitors and smooth the rectified voltage, an inverter unit configured to include a pair of switches and convert the smoothed DC voltage into a driving voltage of a motor according to a control signal, and a control unit configured to generate the control signal, wherein the control unit applies a DC offset voltage to the driving voltage according to a direction of a current applied to the motor on the basis of a result obtained by comparing voltages across the pair of capacitors.

13 Claims, 10 Drawing Sheets

(51) Int. Cl.
    *F04B 35/04*     (2006.01)
    *H02P 27/06*     (2006.01)
    *H02M 1/14*     (2006.01)
    *H02M 5/458*     (2006.01)
    *H02P 25/032*     (2016.01)

(52) U.S. Cl.
    CPC ............ *H02P 25/032* (2016.02); *H02P 27/06* (2013.01); *F04B 2203/0202* (2013.01)

(56) References Cited

U.S. PATENT DOCUMENTS

| | | |
|---|---|---|
| 2006/0127225 A1 | 6/2006 | Kim et al. |
| 2009/0251086 A1* | 10/2009 | Sekimoto ................ H02P 23/30 318/400.23 |
| 2011/0019452 A1* | 1/2011 | Shinomoto ......... H02M 1/4208 363/126 |
| 2011/0061411 A1 | 3/2011 | Kim et al. |
| 2012/0034104 A1 | 2/2012 | Hu et al. |

FOREIGN PATENT DOCUMENTS

| | | |
|---|---|---|
| KR | 10-2009-0042563 | 4/2009 |
| WO | WO 2007/089083 | 8/2007 |
| WO | WO 2013/029610 | 3/2013 |

OTHER PUBLICATIONS

International Search Report dated Feb. 19, 2016 issued in Application No. PCT/KR2015/011648.
European Search Report dated May 11, 2018.
Chinese Office Action dated Jul. 25, 2018 (Translation).

* cited by examiner

[Fig. 1a]
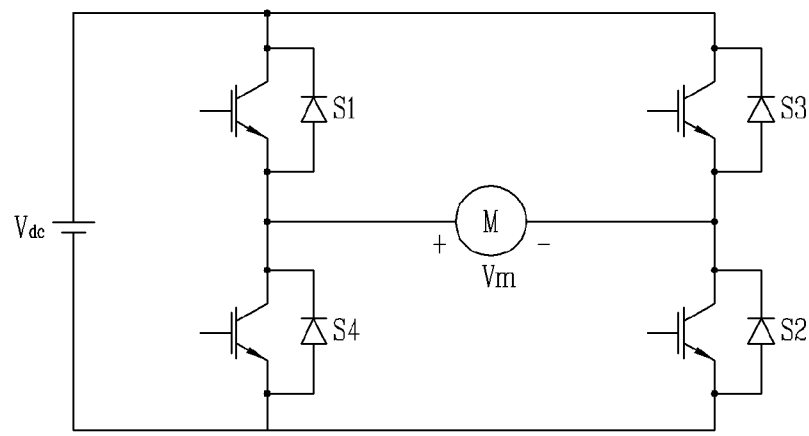
[Fig. 1b]
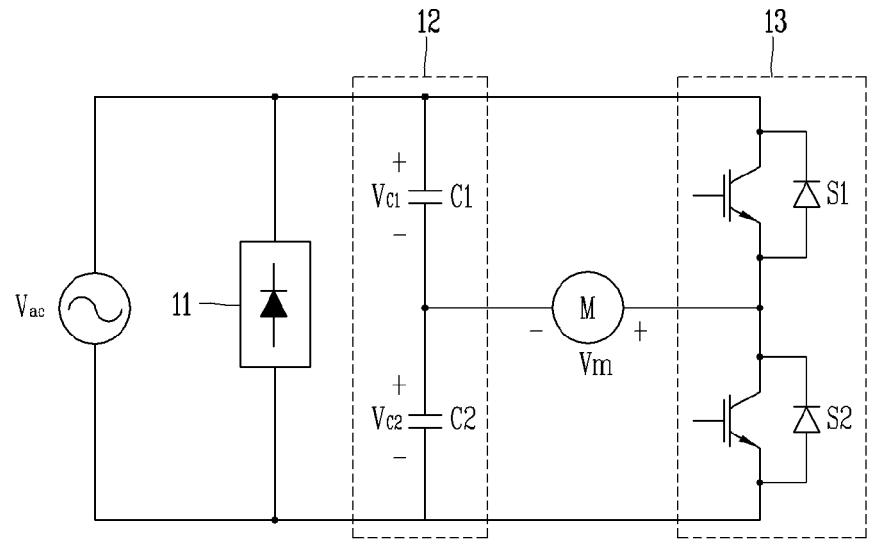

[Fig. 2]
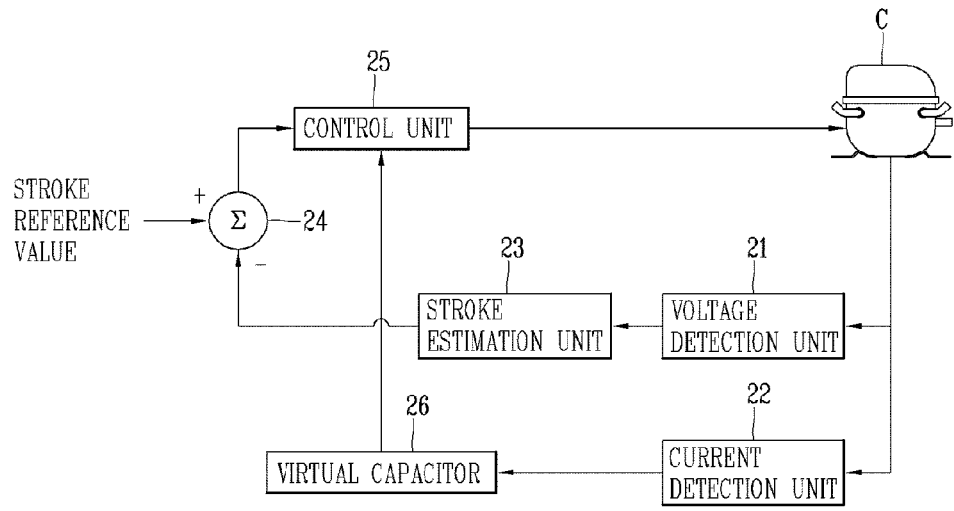
[Fig. 3a]
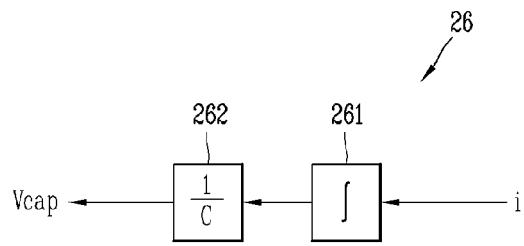
[Fig. 3b]
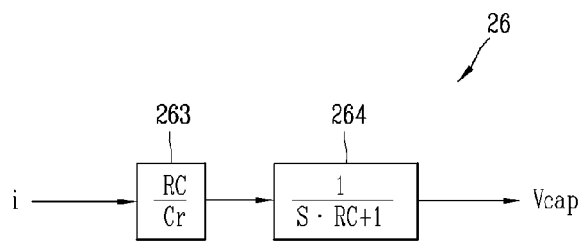

[Fig. 3c]
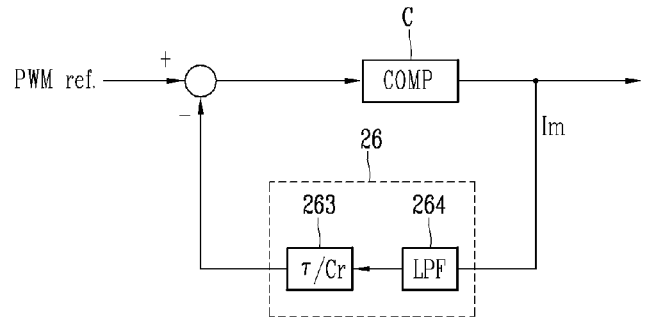
[Fig. 4]
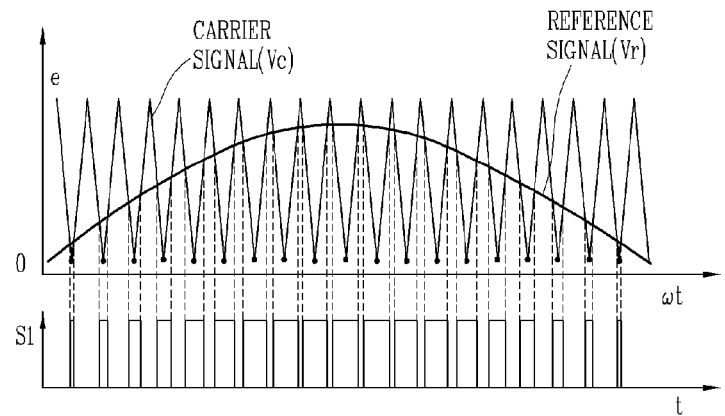
[Fig. 5]
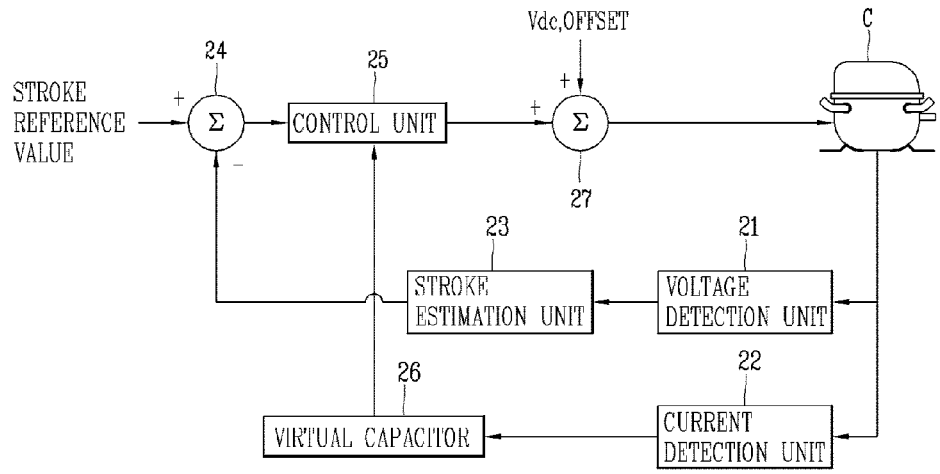

[Fig. 6a]
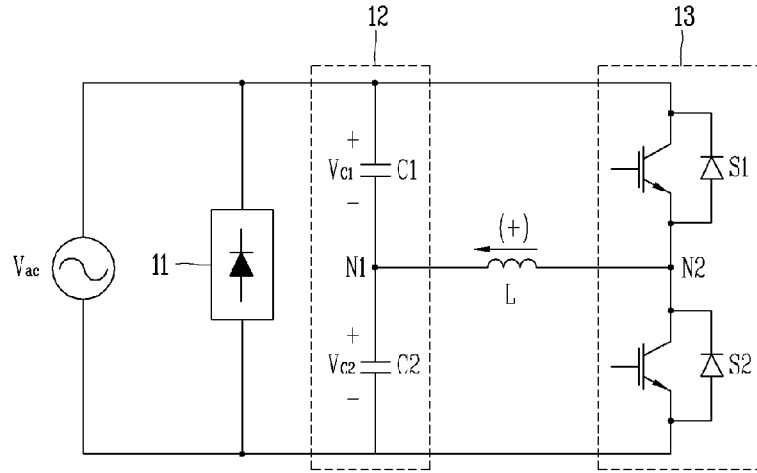
[Fig. 6b]
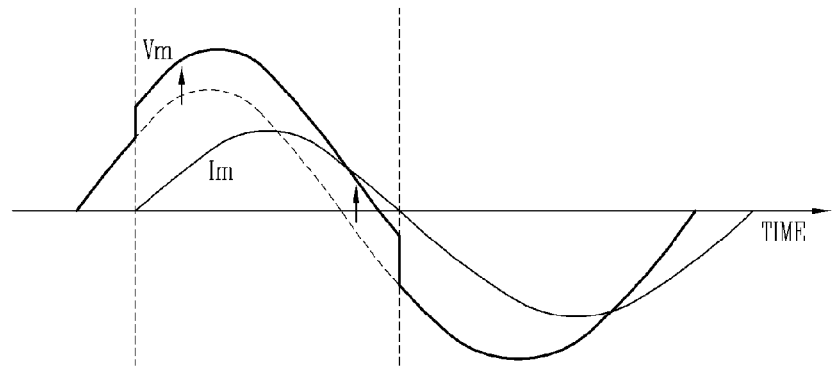
[Fig. 7a]
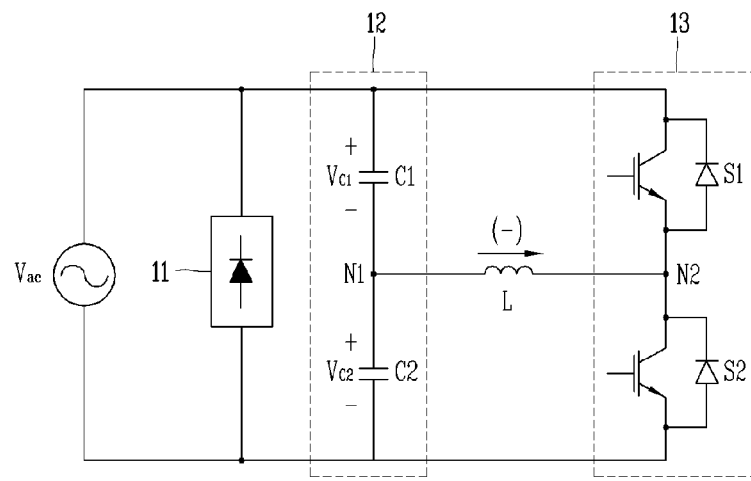

[Fig. 7b]
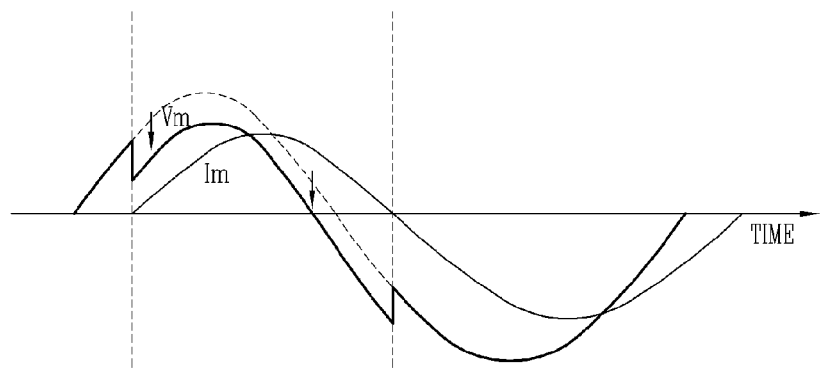
[Fig. 8a]
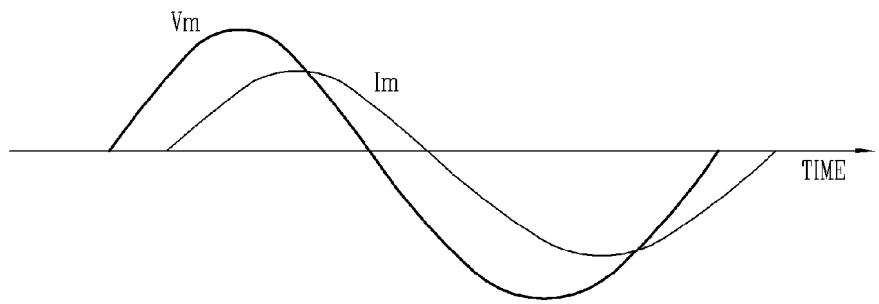

[Fig. 8b]
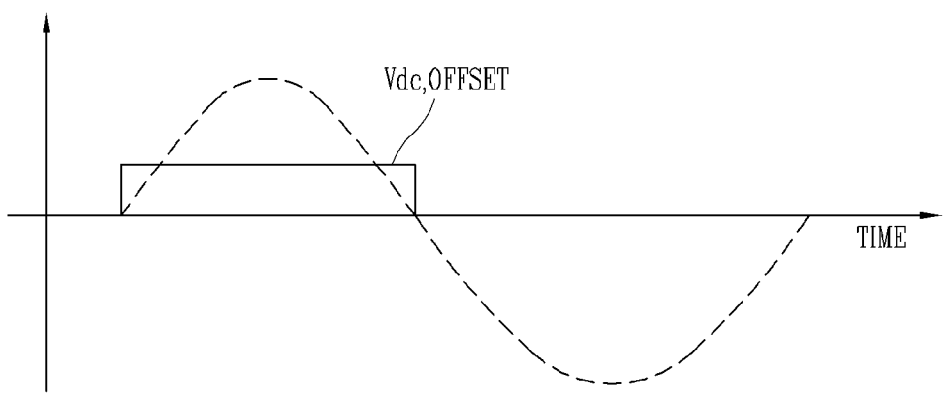
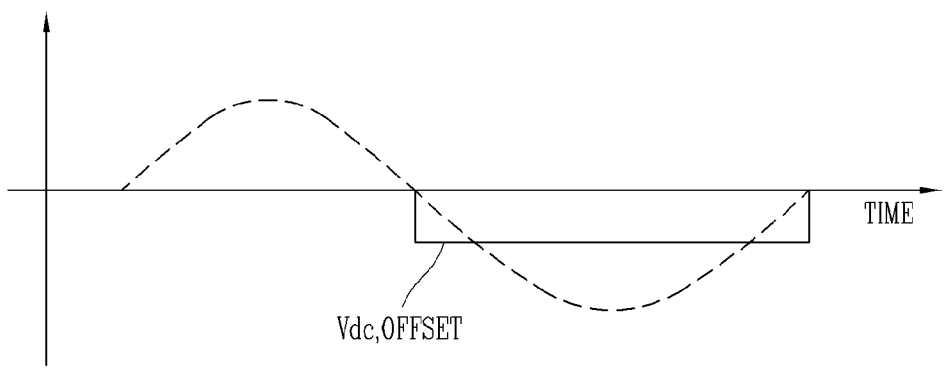

[Fig. 8c]
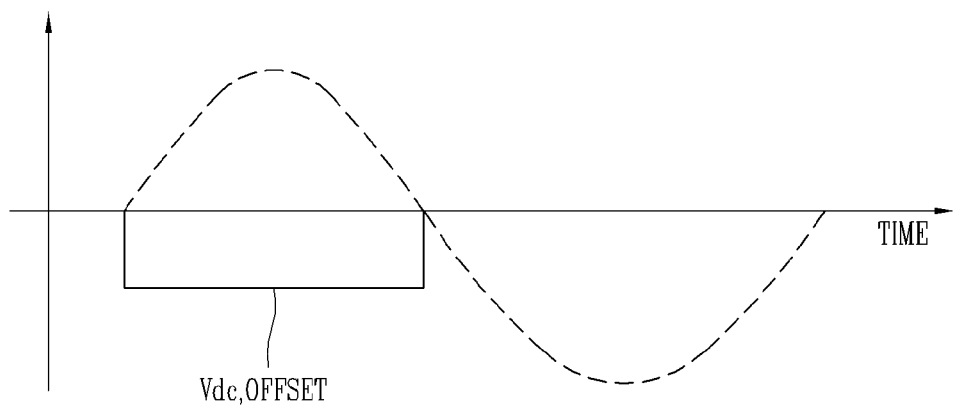
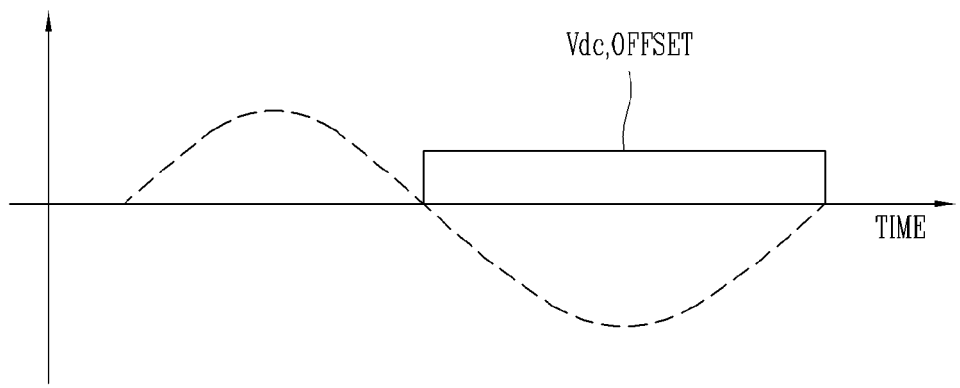

[Fig. 9]
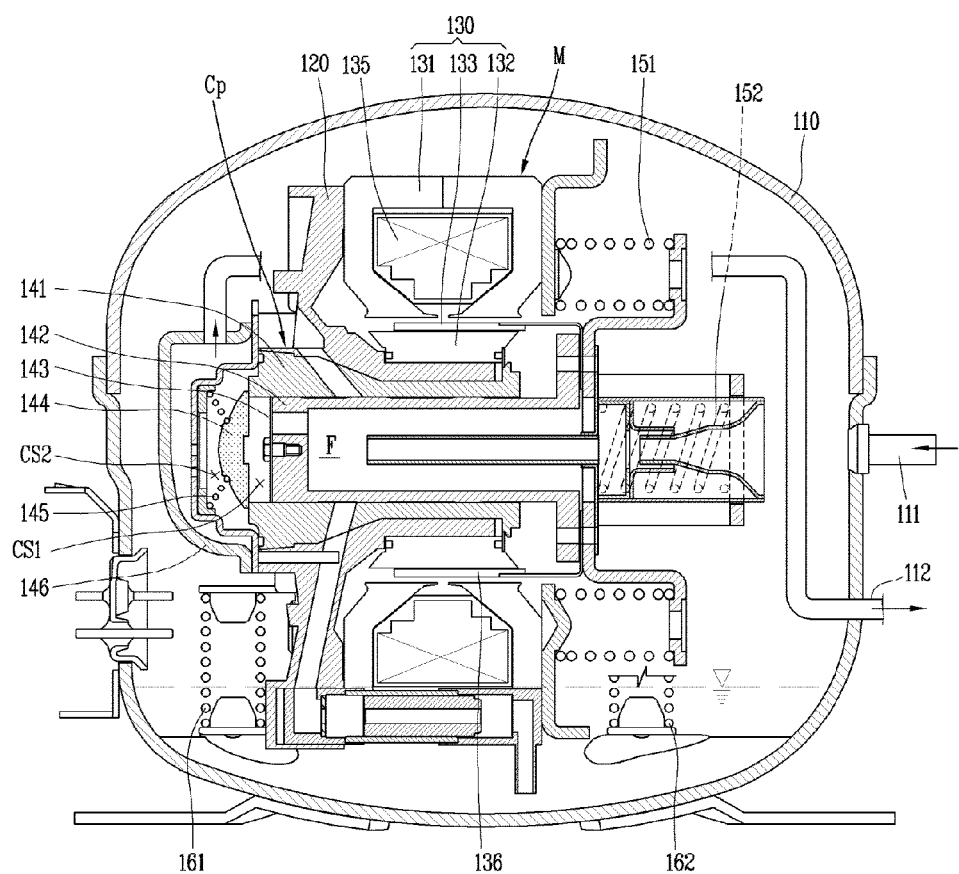

[Fig. 10]
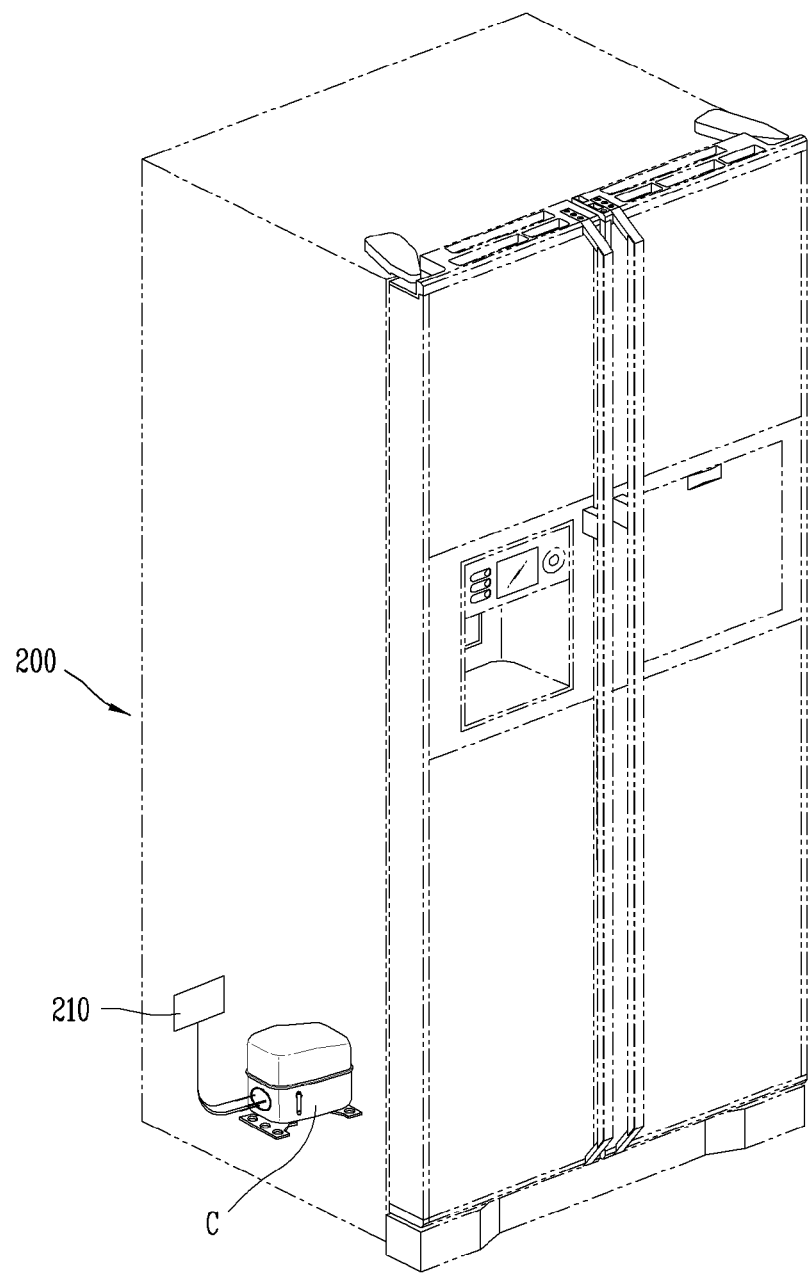

[Fig. 11]
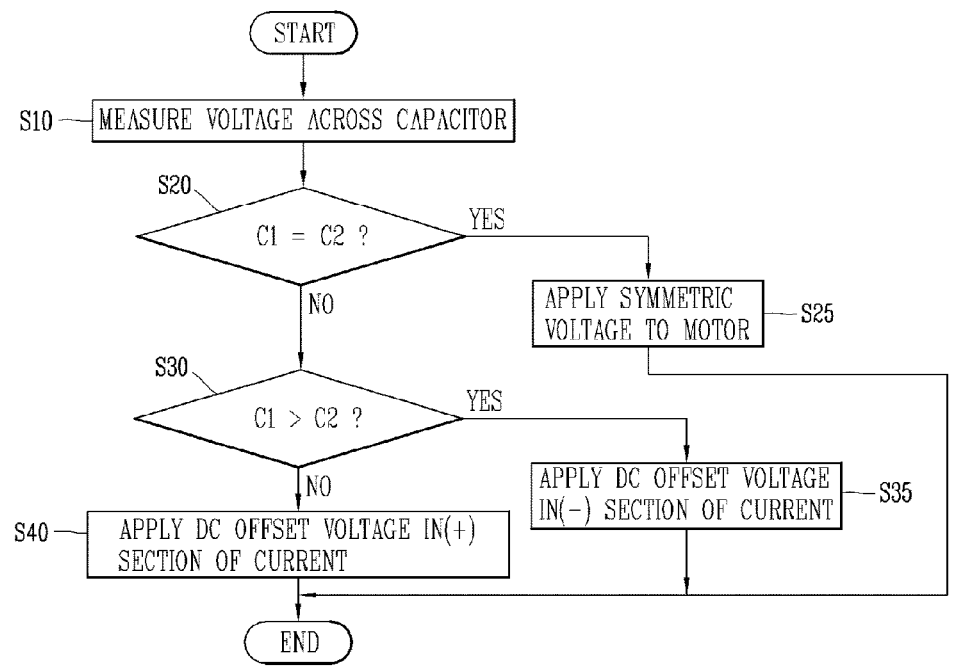

COMPRESSOR CONTROL APPARATUS AND CONTROL METHOD

CROSS-REFERENCE TO RELATED PATENT APPLICATIONS

This application is a U.S. National Stage Application under 35 U.S.C. § 371 of PCT Application No. PCT/KR2015/011648, filed Nov. 2, 2015, which claims priority to Korean Patent Application No. 10-2014-0150495, filed Oct. 31, 2014, whose entire disclosures are hereby incorporated by reference.

TECHNICAL FIELD

The present invention relates to a compressor control apparatus and a control method and, more particularly, to a compressor control apparatus using a half-bridge inverter and a control method.

BACKGROUND ART

In general, a compressor is a mechanical device for compressing a refrigerant, or other various operational gases to increase pressure and widely used in refrigerators and air-conditions.

Compressors may be classified as a reciprocating compressor in which a compression space to of from which an operational gas is intaken or discharged is formed between a piston and a cylinder and the piston makes a linear reciprocating motion within the cylinder to compress a refrigerant, a rotary compressor in which a compression space to and from which an operational gas is intaken and discharged is formed between a eccentrically rotatable roller and a cylinder and the roller eccentrically rotates along an inner wall of the cylinder to compressor a refrigerant, and a scroll compressor in which a compression space, to and from which an operational gas is intaken and discharged is formed between an orbiting scroll and a fixed scroll and an orbiting scroll rotates according to the fixed scroll to compress a refrigerant.

Among the compressors, the reciprocating compressor may be classified into a recipro type reciprocating compressor and a linear type reciprocating compressor depending on a scheme in which the piston is driven.

In detail, the recipro type compressor is based on a scheme in which a crank shaft is coupled to a rotary motor and piston is coupled to the crank shaft to convert rotational force of the rotary motor to a linear reciprocating motion, while the linear type compressor is based on a scheme in which a piston is directly connected to a mover of a linear motor to enable the piston to make a reciprocating motion by a linear motion of the motor.

As described above, since the linear type reciprocating compressor does not have a crank shaft for converting a rotary motion into a linear motion, frictional loss is small, so the linear type reciprocating compressor has compression efficiency higher than that of the recipro type reciprocating compressor.

FIGS. 1A and 1B are views illustrating a related art compressor control apparatus provided in a reciprocating compressor.

As illustrated in FIG. 1A, the related art compressor control apparatus may include a power supply unit Vdc supplying power using external commercial power such that rectified direct current (DC) power having a predetermined magnified may be applied to a compressor motor M, and inverter switch units S1 to S4 converting the DC power into an alternating current (AC) voltage as a driving voltage of the compressor motor M.

Here, a control unit (not shown) may control ON/OFF of the inverter switch units S1 to S4 connected to the compressor motor M in a pulse width modulation (PWM) manner to convert the DC power Vm supplied from the power supply unit Vdc into AC power having a predetermined magnitude and/or frequency, and the thusly converted AC power may be applied to the compressor motor M.

Here, in order to apply AC power to the compressor motor M, the related art control apparatus requires four inverter switches S1 to S4. Thus, a control method and a control circuit configuration for controlling ON/OFF or the four inverter switches S1 to S4 is complicated, and since the four inverter switches have different reaction times, unintended AC power may be applied to the compressor motor M.

In order to solve the problem, Korean Patent Laid-open Publication No. 10-2009-0042563 presents a compressor control apparatus illustrated in FIG. 1B.

As illustrated in FIG. 1B, the related art compressor control apparatus may include a rectifying unit 11 rectifying AC power Vac having a voltage of a predetermined magnitude and supplying DC power, a DC link unit 12 smoothing power of the rectified DC; and an inverter switch unit 13 converting the DC power in to AC power as a driving voltage of a compressor motor M. Here, the inverter switch unit 13 includes two inverter switches S1 and S2, the DC link unit 12 includes two capacitors C1 and C2, one end of the compressor motor is connected to a node to which the two capacitors C1 and C2 are connected, and the other end of the compressor motor is connected to a node to which two inverter switches S1 and S2 are connected.

Power which has been converted to have a predetermined magnitude and frequency through the inverter switch unit 13 is applied to the compressor motor M, so that the reciprocating compressor sequentially performs suction, compression, discharge, and re-expansion strokes by the compressor motor M. That is, when the first inverter switch S1 is in an ON state and the second inverter switch S2 is in an OFF state, a voltage $V_{C1}$ applied to both ends of the first capacitor C1 is applied to the compressor motor M, whereby the re-expansion and suction strokes are sequentially performed.

In this manner, even though the four inverter switch as in the related art are reduced to two ones, the compressor may be able to sequentially perform the suction, compression, discharge and re-expansion strokes, solving the problem of the related art.

Here, if voltages across the first and second capacitors C1 and C2 are not identical due to various reasons and imbalance is generated, AC power having a voltage of an unintended size may be applied to the compressor motor M, degrading reliability in the compressor operation.

In order to solve the problem, a highly efficient capacitor may be used, but the use of a highly efficient capacitor increases manufacturing cost and cannot fundamentally solve the problem of voltage imbalance between both ends of the two capacitors.

DISCLOSURE OF INVENTION

Technical Problem

Therefore, an object of the present invention is to a compressor control apparatus and a control method capable of solving a problem of imbalance in voltages across two capacitors of a DC link unit included in a compressor using a half-bridge inverter.

Solution to Problem

According to an aspect of the present invention, there is provided a compressor control apparatus including: a rectifying unit configured to rectify power applied from the outside; a DC link unit configured to include a pair of capacitors and smooth the rectified voltage; an inverter unit configured to include a pair of switches and convert the smoothed DC voltage into a driving voltage of a motor according to a control signal; and a control unit configured to generate the control signal, wherein the control unit applies a DC offset voltage to the driving voltage according to a direction of a current applied to the motor on the basis of a result obtained by comparing voltages across the pair of capacitors.

According to an embodiment of the present disclosure, when the voltages across the pair of capacitors are equal, the driving voltage to which the offset voltage has been applied is symmetrical horizontally in relation to a zero potential.

According to an embodiment of the present disclosure, when the voltages across the pair of capacitors are different, the driving voltage to which the offset voltage has been applied is asymmetrical horizontally in relation to the zero potential.

According to an embodiment of the present disclosure, the motor may be connected to a first node between a first capacitor and a second capacitor connected in series and a second node between a first inverter switch and a second inverter switch connected in series, and a first loop may be formed by the first capacitor, the first inverter switch, and the motor, and a second loop may be formed by the second capacitor, the second inverter switch, and the motor.

According to an embodiment of the present disclosure, when a voltage across the first capacitor is greater than a voltage across the second capacitor, the control unit may apply a positive DC offset voltage to the driving voltage in a time section of a direction of a first current flowing from the second node to the first node.

According to an embodiment of the present disclosure, when a voltage across the first capacitor is greater than a voltage across the second capacitor, the control unit may apply the driving voltage not including the DC offset voltage in a time section of a direction of a second current flowing from the first node to the second node.

According to an embodiment of the present disclosure, when a voltage across the second capacitor is greater than a voltage across the first capacitor, the control unit may apply a positive DC offset voltage to the driving voltage in a time section of a direction of a second current flowing from the first node to the second node.

According to an embodiment of the present disclosure, when a voltage across the second capacitor is greater than a voltage across the first capacitor, the control unit may apply the driving voltage not including the DC offset voltage in a time section of a direction of a second current flowing from the first node to the second node.

According to an embodiment of the present disclosure, the compressor control apparatus may further include: a current detection unit configured to detect a current of the motor; and a voltage detection unit configured to detect a voltage of the motor, wherein the control unit may generate the control signal on the basis of the motor current and the motor voltage.

According to another aspect of the present invention, there is provided a compressor including: a fixed member including a compression space therein, a moving member compressing a refrigerant intaken to a compression space, while making a linear reciprocating motion within the fixed member, at least one spring installed to elastically support the moving member in a direction in which the moving member moves, a motor installed to be connected to the moving member and enabling the moving member to make a linear reciprocating motion in an axial direction, and a control apparatus of the compressor.

According to another aspect of the present invention, there is provided a method for controlling a control apparatus of a compressor including a rectifying unit configured to rectify power applied from the outside, a DC link unit configured to include a pair of capacitors and smooth the rectified voltage; an inverter unit configured to include a pair of switches and convert the smoothed DC voltage into a driving voltage of a motor according to a control signal, and a control unit configured to generate the control signal, including: driving the motor on the basis of the control signal, wherein the driving of the motor includes: comparing voltages across the pair of capacitors; and applying a DC offset voltage to the driving voltage according to a direction of a current applied to the motor on the basis of the comparison result.

The driving of the motor on the basis of the control signal may include: comparing the voltages across the pair of capacitors; and applying a DC offset voltage to the driving voltage according to a direction of a current applied to the motor on the basis of the comparison result.

According to an embodiment of the present disclosure, when the voltages across the pair of capacitors are equal, the driving voltage to which the offset voltage has been applied is symmetrical horizontally in relation to a zero potential.

According to an embodiment of the present disclosure, when the voltages across the pair of capacitors are different, the driving voltage to which the offset voltage has been applied is asymmetrical horizontally in relation to the zero potential.

According to an embodiment of the present disclosure, in the control apparatus of the compressor, the motor may be connected to a first node between a first capacitor and a second capacitor connected in series and a second node between a first switch and a second switch connected in series, and a first loop may be formed by the first capacitor, the first switch, and the motor, and a second loop may be formed by the second capacitor, the second switch, and the motor, and, in the applying of the offset voltage to the driving voltage, when a voltage across the first capacitor is greater than a voltage across the second capacitor, a positive DC offset voltage may be applied to the driving voltage in a time section of a direction of a first current flowing from the second node to the first node.

According to an embodiment of the present disclosure, in the applying of the offset voltage to the driving voltage, the driving voltage not including the DC offset voltage may be applied in the time section of the direction of the second current flowing from the first node to the second node.

According to an embodiment of the present disclosure, in the control apparatus of the compressor, the motor may be connected to a first node between a first capacitor and a second capacitor connected in series and a second node between a first switch and a second switch connected in series, and a first loop may be formed by the first capacitor, the first switch, and the motor, and a second loop may be formed by the second capacitor, the second switch, and the motor, and, in the applying of the offset voltage to the driving voltage, when a voltage across the second capacitor is greater than a voltage across the first capacitor, a positive DC offset voltage may be applied to the driving voltage in a time section of a direction of a second current flowing from the first node to the second node.

According to an embodiment of the present disclosure, in the applying of the offset voltage to the driving voltage, the driving voltage not including the DC offset voltage may be applied in the time section of the direction of the first current flowing from the second node to the first node.

According to an embodiment of the present disclosure, the method may further include: detecting a motor current and a motor voltage; and generating the control signal on the basis of the motor current and the motor voltage.

According to another aspect of the present invention, there is provided a computer-readable recording medium storing a computer program for executing the compressor control method.

Advantageous Effects of Invention

According to embodiments of the present invention, the compressor control apparatus and the control method have an effect of solving the problem of imbalance in voltages across two capacitors included in a compressor using a half-bridge inverter.

BRIEF DESCRIPTION OF DRAWINGS

FIGS. 1A and 1B are views illustrating a compressor control apparatus included in a related art reciprocating compressor.

FIG. 2 is a block diagram illustrating a configuration of a control apparatus of a reciprocating compressor according to an embodiment of the present disclosure.

FIG. 3A is a conceptual view illustrating a virtual capacitor of FIG. 2.

FIG. 3B is a conceptual view illustrating the virtual capacitor of FIG. 2 illustrated in a frequency domain.

FIG. 3C is a view illustrating simply modeling a compressor control apparatus employing a virtual capacitor according to an embodiment of the present disclosure.

FIG. 4 is a view illustrating an operation of an inverter.

FIG. 5 is a block diagram illustrating a configuration of a control apparatus of a reciprocating compressor according to an embodiment of the present disclosure.

FIG. 6A is a view illustrating an example of a direction of a current flowing in a motor in a compressor control apparatus according to an embodiment of the present disclosure.

FIG. 6B is a view illustrating an example of a waveform of driving voltage and a current applied to a motor in FIG. 6A.

FIG. 7A is a view illustrating another example of a direction of a current flowing in a motor in a compressor control apparatus according to an embodiment of the present disclosure.

FIG. 7B is a view illustrating waveforms of a driving voltage and a current applied to a motor in FIG. 7A.

FIG. 8A is a view illustrating waveforms of a driving voltage and a current applied to a motor according to an embodiment of the present disclosure.

FIG. 8B is a view illustrating an example of a DC offset voltage added to or subtracted from a driving voltage waveform illustrated in FIG. 8A of a driving voltage applied to a motor in FIG. 6A.

FIG. 8C is a view illustrating an example of a DC offset voltage added to or subtracted from a driving voltage waveform illustrated in FIG. 8A of a driving voltage applied to a motor in FIG. 7A.

FIG. 9 is a cross-sectional view illustrating a linear compressor according to an embodiment of the present disclosure.

FIG. 10 is a perspective view illustrating a refrigerator employing a linear compressor according to an embodiment of the present disclosure.

FIG. 11 is a flow chart illustrating a sequential process of a compressor control method according to an embodiment of the present disclosure.

BEST MODE FOR CARRYING OUT THE INVENTION

Hereinafter, the embodiments of the present invention will be described with reference to the accompanying drawings, in which like numbers refer to like elements throughout although the embodiments are different, and a description of the like elements a first embodiment will be used for those of the different embodiment. In the following description, usage of suffixes such as 'module', 'part' or 'unit' used for referring to elements is given merely to facilitate explanation of the present invention, without having any significant meaning by itself. In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings.

Compressor Control Apparatus

FIG. 2 is a block diagram illustrating a configuration of a control apparatus of a reciprocating compressor according to an embodiment of the present disclosure.

As illustrated in FIG. 2, a control apparatus of a reciprocating compressor according to an embodiment of the present disclosure includes a voltage detection unit 21 detecting a motor voltage applied to a motor, a current detection unit 22 detecting a motor current applied to the motor, a stroke estimation unit 23 estimating a stroke according to the detected motor current, the detected motor voltage, and a motor parameter, a comparator 24 comparing the stroke estimation value with a stroke reference value, and outputting a difference between the stroke estimation value and the stroke reference value according to the comparison result, and a control unit 25 varying a voltage applied to the motor according to the difference to control a stroke.

The components of the control apparatus illustrated in FIG. 2 are not essential and a compressor control apparatus including greater or fewer components may be implemented.

The compressor control apparatus according to an embodiment of the present disclosure may be applied to a reciprocating compressor, and in the present disclosure, the compressor control apparatus will be described on the basis of a linear compressor.

Hereinafter, components will be described.

The voltage detection unit 21 detects a motor voltage applied to a compressor motor. According to an embodiment, as illustrated in FIGS. 4A and 5A, the voltage detection unit 21 may measure a DC voltage output from a rectifying unit 11 rectifying AC power Vac having a voltage of a predetermined magnitude or may measure a voltage across at least any one of two capacitors C1 and C2 included in the DC link unit 12.

According to an embodiment, in a compressor control apparatus using a half-bridge inverter, a motor voltage detected by the voltage detection unit 21 may be $V_{C1}$, $V_{C2}$, or the sum of $V_{C1}$ and $V_{C2}$.

Also, the current detection unit 22 serves to detect a motor current applied to the motor. According to an embodiment, as illustrated in FIGS. 4 and 5, the current detection unit 22 may detect a current flowing in a coil L of the compressor motor.

Also, the stroke estimation unit 23 may calculate a stroke estimation value using the detected motor current, the detected motor voltage, and the motor parameter, and apply the calculated stroke estimation value to the comparator 24.

Here, the stroke estimation unit 23 may calculate the stroke estimation value through Equation 1 below.

$$x = \frac{1}{\alpha} \int \left( V_m - Ri_m - L\frac{di_m}{dt} \right) dt \qquad \text{[Math. 1]}$$

Here, x denotes a stroke, α demotes a motor constant or a counter electromotive constant, Vm denotes a motor voltage, im denotes a motor current, R denotes a resistor, and L denotes inductance.

Thus, the comparator 24 compares the stroke estimation value with the stroke reference value and applies a corresponding difference signal to the control unit 25, and accordingly, the control unit 25 controls a stroke by varying a voltage applied to the motor.

That is, when the stroke estimation value is greater than the stroke reference value, the control unit 25 reduces the voltage applied to the motor, and when the stroke estimation value is smaller than the stroke reference value, the control unit 25 reduces the voltage applied to the motor.

Meanwhile, as illustrated in FIG. 2, the compressor control apparatus according to an embodiment of the present invention may further include a virtual capacitor 26. That is, the compressor control apparatus according to an embodiment of the present invention may control the compressor by applying the virtual capacitor 26 instead of the AC capacitor connected to the motor M in series in the related art.

The virtual capacitor may refer to implementation of a voltage of a physically existing capacitor by software by the control unit 25.

Here, the virtual capacitor 26 may integrate the detected motor current i, and multiply a specific constant value to the integrated value to calculate a capacitor voltage Vcap. Here, on the basis of the calculated capacitor voltage, the control unit 25 generates a control signal, and an inverter may output a driving voltage of the motor on the basis of the generated control signal In this manner, since the control unit 25 performs LC resonance operation on the basis of the inductor and the virtual capacitor corresponding to the motor according to an operating frequency, the control unit 25 may control the motor in an unstable region.

That is, when the operating frequency is changed with respect to an LC resonance frequency, if the operating frequency is significantly greater or smaller than the LC resonance frequency, the compressor may enter an unstable control region in which an output is unstably changed according to an application voltage. Thus, the control unit 25 may control the compressor not to operate in the unstable control region by adjusting the LC resonance frequency together according to the operating frequency.

Also, by applying the virtual capacitor 26, the compressor may be effectively controlled.

The linear compressor may have a mechanical resonance frequency determined by a spring constant and a mass of an actuating member or a moving member and an electrical resonance frequency by the inductor corresponding to the compressor motor and the AC capacitor connected to the compressor motor.

In order to efficiently control the compressor, ideally, it is preferred for the operating frequency of the compressor, the mechanical resonance frequency, and the electrical frequency to be the same.

However, in a general linear compressor, it may be different to adjust capacitance of the AC capacitor according to a change in the mechanical resonance frequency or the operating frequency during an operation of the compressor, and thus, it may be difficult to efficiently control the compressor.

Thus, the control unit 25 may perform control such that the operating frequency of the compressor to follow the mechanical resonance frequency, and apply the virtual capacitor 26 instead of the AC capacitor. That is, the control unit 25 may adjust capacitance of the virtual capacitor 26 to correspond to a change in the operating frequency according to a change in the mechanical resonance frequency during an operation, thus efficiently controlling the compressor.

Also, since the compressor control apparatus according to an embodiment of the present invention exclude the physical AC capacitor, manufacturing cost may be reduced.

In detail, FIG. 3A is a conceptual view illustrating the virtual capacitor of FIG. 2.

As illustrated in FIG. 3A, the virtual capacitor 26 may include an integrator 261 integrating the detected motor current and a multiplier 262 for multiplying a specific constant to the integrated value.

The specific constant may be a reciprocal number of target capacitance of the virtual capacitor 26, and thus, the specific constant may be in inverse proportion to capacitance of the virtual capacitor. However, the present invention is not limited thereto and the specific constant may be varied according to calculation schemes.

Thus, a value obtained by multiplying the specific constant to the value obtained by integrating the motor current (i) may be a virtual capacitor voltage Vcap, an output voltage of the virtual capacitor 26.

Meanwhile, in order to generate the control signal, the control unit 25 may generate the control signal on the basis of a voltage (Vref−Vcap) obtained by subtracting the virtual capacitor voltage Vcap from a reference voltage Vref.

Here, when the control signal is generated in a PWM manner by the control unit 25, the reference voltage Vref after subtracting the virtual capacitor voltage Vcap therefrom may correspond to a reference signal Vr illustrated in FIG. 4.

FIG. 4 is a view illustrating an operation of the inverter.

As illustrated in FIG. 4, when the control unit 25 generates a control signal for driving the compressor motor, the control unit 25 may use a carrier signal Vc and the reference signal Vr in order to modulate a pulse width. That is, in order to modulate a pulse width, the control unit 25 may use a carrier signal having a triangular wave form and a reference signal having a sine wave form, for example, and here, the reference signal having a sine wave form may serve as a reference value for controlling the inverter.

The reference signal may be a table voltage output with a predetermined frequency based on a sine table. That is, the reference signal may have a sine wave waveform in a periodical discrete time domain.

In this case, when the reference signal is greater than the carrier signal, the control unit 25 may generate a control signal for turning on a switching element, and when the reference signal is smaller than the carrier signal, the control unit 25 may generate a control signal for turning off the switching element.

Here, when the reference signal is increased, a portion (or a time section) in which the reference signal is greater than the carrier signal may be increased, increasing a turn-on time of the switching element of the inverter, which leads to an increase in a magnitude of a voltage or a current applied to the motor.

Thus, according to an embodiment of the present disclosure, the control unit 25 may control the compressor by adjusting a magnitude, a shape, and a DC average value (or a DC offset value) of the reference signal.

That is, the control unit 25 may subtract the calculated capacitor voltage from the PWM reference signal Vr in the form of a sine wave for adjusting a pulse width of the voltage control signal to generate a changed PWM reference signal, and generate a voltage control signal of the inverter on the basis of the changed PWM reference signal.

Meanwhile, FIG. 3B illustrates the virtual capacitor of FIG. 2 in a frequency domain.

As illustrated in FIG. 3B, the virtual capacitor 26 may include a low pass filter (LPF) 264 performing an integration function and a specific constant (RC/Cr) 263. v Here, RC may be a value obtained by a resistance value related to a cutoff frequency (or a time constant) of the low pass filter 264 and capacitance, and Cr may be a target capacitance value of the virtual capacitor.

FIG. 3C is a view illustrating simply modeling a compressor control apparatus employing a virtual capacitor according to an embodiment of the present disclosure.

As illustrated in FIG. 3C, the virtual capacitor 26 according to an embodiment of the present disclosure enables a motor current Im detected from the compressor C to pass through the low pass filter 265 and multiplies a specific constant ($\tau$/Cr, here, $\tau$ is a time constant related to the cutoff frequency of the low pass filter, and Cr is target capacitance of the virtual capacitor to be implemented) to the motor current Im which has passed through the low pass filter 264 to generate a virtual capacitor voltage Vcap.

When the control unit 25 generates a control signal based on a PWM scheme, the control unit 25 may subtract the virtual capacitor voltage Vcap from the reference signal Vr to generate a new reference signal, and generate the control signal on the basis of the new reference signal.

Thus, the control unit 25 may control the compressor C by driving the inverter on the basis of the newly generated control signal.

However, when the compressor control apparatus for controlling the compressor employing the virtual capacitor according to an embodiment of the present disclosure drives the motor of the compressor by using the half bridge inverter, a PWM duty ratio of the first inverter switch S1 and that of the second inverter switch S2 may be different, which may lead to a difference between voltages across the two capacitors C1 and C2 included in the DC link unit 12.

Thus, as illustrated in FIGS. 6A and 7A, the compressor control apparatus according to an embodiment of the present disclosure may include a rectifying unit 11 rectifying power applied from the outside, a DC link unit 12 smoothing the rectified voltage, an inverter unit 13 including a pair of switches S1 and S2 and converting the smoothened DC voltage into a driving voltage of the motor according to a control signal, and a control unit 25 generating the control signal, and here, the control unit 25 may apply a DC offset voltage to the driving voltage according to a direction of a current applied to the motor on the basis of the result of comparing the voltages across the capacitors.

According to an embodiment, the control unit 25 may compare the voltages $V_{C1}$ and $V_{C2}$ across the capacitors C1 and C2 included in the DC link unit 12, and the voltages $V_{C1}$ and $V_{C2}$ across the two capacitors C1 and C2 may be detected by the voltage detection unit 21 or may be detected by a separate voltage measurement unit in addition to the voltage detection unit 21.

First, when the voltages $V_{C1}$ and $V_{C2}$ across the two capacitors C1 and C2 included in the DC link unit 12 are equal, a driving voltage applied to the motor may be horizontally symmetrical in relation to a zero potential.

For example, as illustrated in FIG. 8A, a voltage applied to the motor may be horizontally symmetrical.

That is, since a voltage imbalance has not occurred between the two capacitors C1 and C2, the driving voltage converted by the inverter unit 13, without having to add or subtract a DC offset voltage, may be applied.

Alternatively, in a case in which a magnitude of the voltage $V_{C1}$ across the first capacitor C1 at the upper side, among the two capacitors C1 and C2, and a magnitude of the voltage VD2 across the second capacitor C2 at the lower side are not equal, a driving voltage applied to the motor may be asymmetrical in relation to the zero potential.

That is, as illustrated in FIG. 5, a DC offset voltage (Vdc, OFFSET) is added to or subtracted from the driving voltage of the motor applied to the compressor C in a predetermined time section (27), and the offset voltage-added or subtracted driving voltage may be applied to the motor.

Here, the DC offset voltage (Vdc, OFFSET) having a predetermined magnitude may be added to or subtracted from the driving voltage of the motor through various known methods. For example, a control signal may be generated such that a voltage applied to the motor according to a control signal generated by the control unit 25 has a driving voltage waveform to which the DC offset voltage illustrated in FIG. 6B has been added, or the DC offset voltage (Vdc, OFFSET) may be directly added to or subtracted from the driving voltage converted by the inverter unit 13 and applied to the motor after being converted, so as to be applied.

In the present disclosure, in order to facilitate explanation, as illustrated in FIGS. 6A and 7A, it is assumed that a first node N1 is a node positioned between the first capacitor C1 and the second capacitor C2, to which one end of the motor is connected, and a second node N2 is a node positioned between the first inverter switch S1 and the second inverter switch S2, to which the other end of the motor is connected. Also, it is assumed that a first loop is a loop formed by the first capacitor C1, the first inverter switch S1, and the motor, and a second loop is a loop formed by the second capacitor C2, the second inverter switch S2, and the motor.

In detail, in a case in which a magnitude of the voltage $V_{C1}$ across the first capacitor C1 at an upper side among the two capacitors C1 and C2 included in the DC link unit 12 is greater than that of the voltage $V_{C2}$ across the second capacitor C2, a positive (+) DC offset voltage (Vdc, OFFSET) may be applied to the driving voltage of the motor in time section of a direction (which will be used together with a term of "(+) direction" in the present disclosure) of a first current flowing from the second node N2 to the first node N1.

For example, as illustrated in FIG. 6B, a positive (+) DC voltage having a predetermined magnitude may be applied in a section in which a voltage applied to the motor is asymmetrical horizontally and the direction of the current Im applied to the motor is the (+) direction, and at the same time, a driving voltage not including a DC offset voltage may be applied in a section in which a direction of the current Im applied to the motor is a (−) direction. That is, the positive (+) DC offset voltage having a waveform illustrated in FIG. 8B(a) may be added to the driving voltage Vm applied to the motor having the waveform illustrated in FIG. 8A (or a negative (−) DC offset voltage is subtracted therefrom).

Alternatively, a negative (−) DC voltage having a predetermined magnitude may be applied in a section in which the voltage applied to the motor is asymmetrical and a direction of the current Im applied to the motor is the (−) direction, and at the same time, a driving voltage not including the DC offset voltage may be applied to the motor in a section in which a direction of the current Im applied to the motor is the (+) direction. That is, the negative (−) DC offset voltage having the waveform illustrated in FIG. 8B(b) may be added to the driving voltage Vm applied to the motor having the waveform illustrated in FIG. 8A (or the positive (+) DC offset voltage is subtracted therefrom).

In this manner, since the DC offset voltage is additionally applied to the motor, current introduced to the second capacitor C2 may be increased to increase the voltage across the second capacitor C2, and accordingly, the voltages across the first capacitor C1 and the second capacitor C2 may become equal to be balanced.

Here, the magnitude of the DC offset voltage (Vdc, OFFSET) may be a preset value. Preferably, the magnitude of the DC offset voltage (Vdc, OFFSET) may be set on the basis of a voltage difference between the first capacitor C1 and the second capacitor C2, or may be set on the basis of a difference between magnitudes of a current flowing in the motor in a first direction and a current flowing in the motor in a second direction, and thus, the magnitude of the DC offset voltage (Vdc, OFFSET) may be adaptively varied.

Thus, until when a magnitude of the voltage across the second capacitor C2 becomes equal to a target magnitude of the voltage across the first capacitor C1, the control unit 25 may additionally apply the DC offset voltage (Vdc, OFFSET) to the driving voltage of the motor.

Also, in a case in which the magnitude of the voltage $V_{C2}$ across the second capacitor C2 at the lower side among the two capacitors C1 and C2 included in the DC link unit 12 is greater than the magnitude of the voltage VD1 across the first capacitor C1, a positive DC offset voltage (Vdc, OFFSET) may be applied to the driving voltage of the motor in a time section of the direction (− direction) of the second current flowing from the first node N1 to the second node N2 through the motor (or the coil L of the motor).

For example, as illustrated in FIG. 7B, the driving voltage not including the DC offset voltage may be applied to the motor in a section in which a voltage applied to the motor is asymmetrical horizontally and a direction of the current Im applied to the motor is the (+) direction, and at the same time, a positive (+) DC voltage having a predetermined magnitude may be applied in a section in which the direction of the current applied to the motor is the (−) direction. That is, the positive (+) DC offset voltage having the waveform illustrated in FIG. 8C(b) may be added to the driving voltage Vm applied to the motor having the waveform illustrated in FIG. 8A (or the negative (−) DC offset voltage is subtracted therefrom).

Alternatively, a negative (−) DC voltage having a predetermined magnitude may be applied in a section in which the voltage applied to the motor is asymmetrical and a direction of the current Im applied to the motor is the (+) direction, and at the same time, a driving voltage not including the DC offset voltage may be applied to the motor in a section in which a direction of the current Im applied to the motor is the (−) direction. That is, the negative (−) DC offset voltage having the waveform illustrated in FIG. 8C(a) may be added to the driving voltage Vm applied to the motor having the waveform illustrated in FIG. 8A (or the positive (+) DC offset voltage is subtracted therefrom).

In this manner, since the DC offset voltage is additionally applied to the motor, current introduced to the first capacitor C1 may be increased to increase the voltage across the first capacitor C1, and accordingly, the voltages across the first capacitor C1 and the second capacitor C2 may become equal to be balanced.

Thus, until when the magnitude of the voltage across the first capacitor C1 becomes equal to the magnitude of the voltage across the second capacitor C2, the control unit 25 may additionally apply the DC offset voltage (Vdc, OFFSET) to the driving voltage of the motor.

Thus, the compressor control apparatus according to an embodiment of the present disclosure may solve the aforementioned problem even though a problem in which voltages across the two capacitors of the DC link unit 12 are unbalanced arises.

Linear Compressor

The linear compressor employing the compressor control apparatus according to an embodiment of the present disclosure may include a fixed member including a compression space therein, a moving member compressing a refrigerant intaken to a compression space, while making a linear reciprocating motion within the fixed member, at least one spring installed to elastically support the moving member in a direction in which the moving member moves, a motor installed to be connected to the moving member and enabling the moving member to make a linear reciprocating motion in an axial direction, and a control apparatus of the linear compressor.

FIG. 9 is a cross-sectional view illustrating a linear compressor according to an embodiment of the present disclosure.

The linear compressor according to an embodiment of the present disclosure may be a linear compressor to which the linear compressor control apparatus is applied or a linear compressor to which a compressor control apparatus is applicable, regardless of type or form of linear compressors. The linear compressor according to an embodiment of the present disclosure illustrated in FIG. 9 is merely illustrative and the scope of the present disclosure is not limited thereto In general, in a motor applied to the compressor, a winding coil is installed in a stator and a magnet is installed in a mover, and the mover makes a rotary motion or reciprocating motion according to an interaction between the winding action and the magnet.

The winding coil may be variously formed according to types of motors. For example, in case of a rotary motor, the winding coil is wound as a concentrated winding or as a distributed winding in a plurality of slots formed along a circumferential direction on an inner surface of the stator. In case of a reciprocating motor, a coil is wound in an annular form to form a winding coil, and a plurality of core sheets are inserted to an outer circumferential surface of the winding coil in a circumferential direction so as to be coupled.

In particular, in the case of the reciprocating motor, since a coil is wound in an annular form to form a winding coil, in general, a coil is wound around an annular bobbin formed of a plastic material to form a winding coil.

As illustrated in FIG. 9, the reciprocating compressor, a frame 120 is elastically installed by a plurality of support springs 161 and 162 in an internal space of a hermetically closed shell 110. In the internal space of the shell 110, an intake pipe 111 connected to an evaporator (not shown) of a refrigerant cycle is installed in a communicating manner, and a discharge pipe 112 connected to a condenser (not shown) of the refrigerant cycle is installed in a communicating manner at one side of the intake pipe 111.

An outer stator 131 and an inner stator 132 of the reciprocating motor 130 forming a motor unit M are fixedly installed in the frame 120, and a mover 133 making a reciprocating motion is installed between the outer stator 131 and the inner stator 132. A piston 142 forming a compression part Cp together with a cylinder 141 is coupled to the mover 133 of the reciprocating motor 130 such that the piston 142 makes a reciprocating motion.

The cylinder 141 is installed in an overlapping range in an axial direction with the stators 131 and 132 of the reciprocating motor 130. A compression space CS1 is formed in the cylinder 141, and an intake flow channel F guiding a refrigerant to the compression space CS1 is formed in the piston 142. An intake valve 143 for opening and closing the intake flow channel F is installed at an end of the intake flow channel F, and a discharge valve 144 for opening and closing the compression space CS1 of the cylinder 141 is installed in a front end surface of the cylinder 141.

A plurality of resonance springs 151 and 152 inducing a resonance movement of the piston 142 are installed at both side of the piston 142 in a movement direction.

Reference numeral 135 denotes a winding coil, 135 denotes a magnet, 137 denotes a bobbin body, 137a denotes a coil installation portion, 138 denotes a bobbin cover, 139 denotes a coil, 145 is a valve spring, and 146 is a discharge cover.

In the related art reciprocating compressor, when power is applied to the coil 135 of the reciprocating motor 130, the mover 133 of the reciprocating motor 130 make a reciprocating motion. Then, the piston 142 coupled to the motor 133 makes a reciprocating motion at a high speed within the cylinder 141 to enable a refrigerant to be intaken to the internal space of the shell 110 through the intake pipe 111. Then, the refrigerant in the internal space of the shell 110 is intaken to the compression space CS1 of the cylinder 141 through the intaken flow channel F of the piston 142, and when the piston 142 makes a forward movement, the refrigerant is discharged from the compression space CS1 and moved to a condenser of the refrigerant cycle through the discharge pipe 112. This sequential process is repeated performed.

Here, the outer stator 131 is formed by stacking a plurality of thin half stator cores formed to have a "⊏" shape (or a channel shape) and symmetrical in a horizontal direction radially at both sides of winding coil 135 horizontally. Thus, in the outer stator 131, the core sheets (not shown) are stacked such that both sides of inner circumferential surfaces of neighboring core sheets (not shown) are in contact with each other, while both sides of outer circumferential surfaces of neighboring core sheets (not shown) are spaced apart from one another by a predetermined interval so as to be stacked.

Compressor Control Method

FIG. 11 is a flow chart illustrating a sequential process of a compressor control method according to an embodiment of the present disclosure.

The compressor control method according to an embodiment of the present disclosure, which is to control a control apparatus of a compressor including a rectifying unit 11 rectifying power applied from the outside, a DC link unit 12 including a pair of capacitors and smoothing the rectified voltage, an inverter unit 13 including a pair of switches and converting the smoothened DC voltage into a driving voltage of the motor according to a control signal, and a control unit 25 generating the control signal, includes driving the motor on the basis of the control signal, wherein the driving of the motor includes: measuring a voltage across each of the capacitors (step S10), comparing the measured voltages across the two capacitors (step S20 and S30), and applying a DC offset voltage to the driving voltage according to a direction of a current applied to the motor on the basis of the comparison result (step S25, step S35, and step S40).

Hereinafter, the components will be described in detail with reference to FIGS. 1 through 9.

In step (S10) of measuring voltages across the capacitors, voltages $V_{C1}$ and $V_{C2}$ of the two capacitors C1 and C2 included in the DC link unit 12 may be detected by the voltage detection unit 21 or may be detected by a separate voltage measurement unit other than the voltage detection unit 21.

Thereafter, in steps (S20 and S30) of comparing the measured voltages across the two capacitors, the control unit 25 compares the measured voltages $V_{C1}$ and $V_{C2}$ across the two capacitors C1 and C2 included in the DC link unit 12.

Here, when the voltages $V_{C1}$ and $V_{C2}$ across the two capacitors C1 and C2 included in the DC link unit 12 are equal, a motor voltage symmetrical horizontally in relation to a zero potential may be applied to the motor (S25).

For example, as illustrated in FIG. 8A, the voltage applied to the motor may be symmetrical horizontally.

That is, since a voltage imbalance does not occur between the two capacitors C1 and C2, there is no need to add or subtract a DC offset voltage as described hereinafter and the inverter unit 13 may apply the converted driving voltage to the motor.

Alternatively, in a case in which a magnitude of the voltage $V_{C1}$ across the first capacitor C1 at the upper side among the two capacitors C1 and C2 included in the DC link unit 12 and a magnitude of the voltage $V_{C2}$ across the second capacitor C2 are not identical, a motor voltage asymmetrical horizontally in relation to the zero potential may be applied to the motor (S35 and S40).

That is, as illustrated in FIG. 5, a DC offset voltage (Vdc, OFFSET) is added to or subtracted from the driving voltage of the motor applied to the compressor C in a predetermined time section (27), and the offset voltage-added or subtracted driving voltage may be applied to the motor.

Here, the DC offset voltage (Vdc, OFFSET) having a predetermined magnitude may be added to or subtracted from the driving voltage of the motor through various known methods. For example, a control signal may be generated such that a voltage applied to the motor according to a control signal generated by the control unit 25 has a driving voltage waveform to which the DC offset voltage illustrated in FIG. 6B has been added, or the DC offset voltage (Vdc, OFFSET) may be directly added to or subtracted from the driving voltage converted by the inverter unit 13 and applied to the motor after being converted, so as to be applied.

In detail, in a case in which a magnitude of the voltage $V_{C1}$ across the first capacitor C1 at an upper side among the two capacitors C1 and C2 included in the DC link unit 12 is greater than that of the voltage $V_{C2}$ across the second capacitor C2, a positive (+) DC offset voltage (Vdc, OFFSET) may be applied to the driving voltage of the motor in time section of a direction of a first current flowing from the second node N2 to the first node N1 (S40).

For example, as illustrated in FIG. 6B, a positive (+) DC voltage having a predetermined magnitude may be applied in a section in which a voltage applied to the motor is asymmetrical horizontally and the direction of the current Im applied to the motor is the (+) direction, and at the same time, a driving voltage not including a DC offset voltage may be applied in a section in which a direction of the current Im applied to the motor is a (−) direction. That is, the positive (+) DC offset voltage having a waveform illustrated in FIG. 8B(a) may be added to the driving voltage Vm applied to the motor having the waveform illustrated in FIG. 8A (or a negative (−) DC offset voltage is subtracted therefrom).

Alternatively, a negative (−) DC voltage having a predetermined magnitude may be applied in a section in which the voltage applied to the motor is asymmetrical and a direction of the current Im applied to the motor is the (−) direction, and at the same time, a driving voltage not including the DC offset voltage may be applied to the motor in a section in which a direction of the current Im applied to the motor is the (+) direction. That is, the negative (−) DC offset voltage having the waveform illustrated in FIG. 8B(b) may be added to the driving voltage Vm applied to the motor having the waveform illustrated in FIG. 8A (or the positive (+) DC offset voltage is subtracted therefrom).

In this manner, since the DC offset voltage is additionally applied to the motor, current introduced to the second capacitor C2 may be increased to increase the voltage across the second capacitor C2, and accordingly, the voltages across the first capacitor C1 and the second capacitor C2 may become equal to be balanced.

Here, the magnitude of the DC offset voltage (Vdc, OFFSET) may be a preset value. Preferably, the magnitude of the DC offset voltage (Vdc, OFFSET) may be set on the basis of a voltage difference between the first capacitor C1 and the second capacitor C2, or may be set on the basis of a difference between magnitudes of a current flowing in the motor in a first direction and a current flowing in the motor in a second direction, and thus, the magnitude of the DC offset voltage (Vdc, OFFSET) may be adaptively varied.

Thus, until when a magnitude of the voltage across the second capacitor C2 becomes equal to a target magnitude of the voltage across the first capacitor C1, the control unit 25 may additionally apply the DC offset voltage (Vdc, OFFSET) to the driving voltage of the motor.

Also, in a case in which the magnitude of the voltage $V_{C2}$ across the second capacitor C2 at the lower side among the two capacitors C1 and C2 included in the DC link unit 12 is greater than the magnitude of the voltage VD1 across the first capacitor C1, a positive DC offset voltage (Vdc, OFFSET) may be applied to the driving voltage of the motor in a time section of the direction (− direction) of the second current flowing from the first node N1 to the second node N2 through the motor (or the coil L of the motor).

For example, as illustrated in FIG. 7B, the driving voltage not including the DC offset voltage may be applied to the motor in a section in which a voltage applied to the motor is asymmetrical horizontally and a direction of the current Im applied to the motor is the (+) direction, and at the same time, a positive (+) DC voltage having a predetermined magnitude may be applied in a section in which the direction of the current applied to the motor is the (−) direction. That is, the positive (+) DC offset voltage having the waveform illustrated in FIG. 8C(b) may be added to the driving voltage Vm applied to the motor having the waveform illustrated in FIG. 8A (or the negative (−) DC offset voltage is subtracted therefrom).

Alternatively, a negative (−) DC voltage having a predetermined magnitude may be applied in a section in which the voltage applied to the motor is asymmetrical and a direction of the current Im applied to the motor is the (+) direction, and at the same time, a driving voltage not including the DC offset voltage may be applied to the motor in a section in which a direction of the current Im applied to the motor is the (−) direction. That is, the negative (−) DC offset voltage having the waveform illustrated in FIG. 8C(a) may be added to the driving voltage Vm applied to the motor having the waveform illustrated in FIG. 8A (or the positive (+) DC offset voltage is subtracted therefrom).

In this manner, since the DC offset voltage is additionally applied to the motor, current introduced to the first capacitor C1 may be increased to increase the voltage across the first capacitor C1, and accordingly, the voltages across the first capacitor C1 and the second capacitor C2 may become equal to be balanced.

Thus, until when the magnitude of the voltage across the first capacitor C1 becomes equal to the magnitude of the voltage across the second capacitor C2, the control unit 25 may additionally apply the DC offset voltage (Vdc, OFFSET) to the driving voltage of the motor.

Thus, the compressor control apparatus according to an embodiment of the present disclosure may solve the aforementioned problem even though a problem in which voltages across the two capacitors of the DC link unit 12 are unbalanced arises.

Computer-Readable Recording Medium

The method for controlling a compressor according to an exemplary embodiment of the present disclosure may be implemented in the form of a program command that may be performed through various computer units and recorded in a computer-readable medium. The computer-readable recording medium may include a program command, a data file, a data structure, and the like, alone or in a form of a combination thereof. A program command recorded in the medium may be particularly designed or configured for the present invention or may be known to be used by a computer software person in the art. Examples of the computer-readable recording medium include a hardware device particularly configured to store and perform a program command, such as a magnetic medium such as a hard disk, a floppy disk, or a magnetic tape, an optical medium such as a CD-ROM or a DVD, a magneto-optical medium such as a floptical disk, and a ROM, a RAM, a flash memory, or the like. The program instructions may include, for example, a high-level language code that can be executed by a computer using an interpreter, as well as a machine language code made by a compiler. The hardware device described herein may be configured to be operated by one or more software modules to perform processing according to the present invention, and vice versa.

Refrigerator

A refrigerator to which a linear compressor controlled by the compressor control apparatus and/or the control method described above is applied may include a refrigerator body, a linear compressor provided in the refrigerator body and compressing a refrigerant, and a control apparatus of the linear compressor.

Hereinafter, a refrigerator to which the linear compressor or the compressor control apparatus according to an embodiment of the present disclosure is applicable will be described with reference to FIG. 10.

FIG. 10 is a perspective view illustrating a refrigerator employing a linear compressor according to an embodiment of the present disclosure.

The refrigerator according to an embodiment of the present disclosure may be a refrigerator to which the linear compressor or the compressor control apparatus is applicable, regardless of type or form of refrigerators. The refrigerator to which the linear compressor or the compressor control apparatus according to an embodiment of the present disclosure is applicable illustrated in FIG. 10 is merely illustrative and the scope of the present disclosure is not limited thereto.

As illustrated in FIG. 10, a refrigerator 200 includes a main board 210 controlling a general operation of the refrigerator 200 and a reciprocating compressor C is connected to the main board 210. The compressor control apparatus and a driving device of a 3-phase motor may be provided in the main board 210. The refrigerator 200 is operated according to driving of the reciprocating compressor. A cooling air supplied to the interior of the refrigerator 200 may be generated according to a heat exchange operation of the refrigerant, and continuously supplied to the interior of the refrigerator 200 as a cycle of compression, condensation, expansion, and evaporation is repeatedly performed The supplied refrigerant is evenly transmitted to the interior of the refrigerator 200 by a convection current to keep food items in storage within the refrigerator at a desired temperature.

The exemplary embodiments of the present invention will now be described with reference to the accompanying drawings, in which like numbers refer to like elements throughout. In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings. The technical idea of the present invention should be interpreted to embrace all such alterations, modifications, and variations in addition to the accompanying drawings.

The invention claimed is:

1. A compressor control apparatus, comprising:
a rectifying unit configured to rectify power applied from an outside;
a DC link unit configured to include a first capacitor and a second capacitor and smooth the rectified voltage;
an inverter unit configured to include a first inverter switch and a second inverter switch and convert the smoothed DC voltage into a driving voltage of a motor according to a control signal; and
a control unit configured to generate the control signal, wherein the control unit applies a DC offset voltage to the driving voltage according to a direction of a current applied to the motor on the basis of a result obtained by comparing voltages across the first capacitor and the second capacitor, wherein when a voltage across the first capacitor is greater than a voltage across the second capacitor, the control unit applies the driving voltage not including the DC offset voltage in a time section of a direction of a second current flowing from a first node to a second node.

2. The compressor control apparatus of claim 1, wherein when the voltages across the first capacitor and the second capacitor are equal, the driving voltage to which the offset voltage has been applied is symmetrical horizontally in relation to a zero potential.

3. The compressor control apparatus of claim 1, wherein when the voltages across the first capacitor and the second capacitor are different, the driving voltage to which the offset voltage has been applied is asymmetrical horizontally in relation to the zero potential.

4. The compressor control apparatus of claim 3, wherein the motor is connected to the first node between the first capacitor and the second capacitor connected in series and the second node between a first inverter switch and a second inverter switch connected in series, and a first loop is formed by the first capacitor, the first inverter switch, and the motor, and a second loop is formed by the second capacitor, the second inverter switch, and the motor.

5. The compressor control apparatus of claim 1, wherein when a voltage across the second capacitor is greater than a voltage across the first capacitor, the control unit applies the driving voltage not including the DC offset voltage in a time section of a direction of a first current flowing from the second node to the first node.

6. The compressor control apparatus of claim 4, wherein the controller additionally applies the DC offset voltage to the driving voltage until when the voltage across the first capacitor and the voltage across the second capacitor become equal.

7. The compressor control apparatus of claim 1, wherein a magnitude of the DC offset voltage is set on the basis of a difference between the measured voltages across the two capacitors.

8. The compressor control apparatus of claim 1, wherein a magnitude of the DC offset voltage is set on the basis of a difference between a magnitude of a current flowing in the first direction of the motor and a magnitude of a current flowing in a second direction.

9. A method for controlling a compressor including a rectifying unit configured to rectify power applied from an outside, a DC link unit configured to include a first capacitor and a second capacitor and smooth the rectified voltage, an inverter unit configured to include a first inverter switch and a second inverter switch and convert the smoothed DC voltage into a driving voltage of a motor according to a control signal, and a control unit configured to generate the control signal, the method comprising:
measuring a voltage across each of the first capacitor and the second capacitor;
comparing the measured voltages across the two capacitors; and
applying a DC offset voltage to the driving voltage according to a direction of a current applied to the motor on the basis of the comparison result, wherein when a voltage across the first capacitor is greater than a voltage across the second capacitor, the driving voltage not including the DC offset voltage is applied in a time section of a direction of a second current flowing from a first node to a second node.

10. The method of claim 9, when the magnitudes of the measured voltages across the first capacitor and the second capacitor are equal, applying a motor voltage symmetrical horizontally in relation to a zero potential to the motor.

11. The method of claim 9, further comprising:
when the magnitudes of the measured voltages across the first capacitor and the second capacitor are different, applying a motor voltage asymmetrical horizontally in relation to the zero potential to the motor.

12. The method of claim 11, wherein the motor is connected to the first node between the first capacitor and the second capacitor connected in series and the second node between a first inverter switch and a second inverter switch connected in series, and a first loop is formed by the first capacitor, the first inverter switch, and the motor, and a second loop is formed by the second capacitor, the second inverter switch, and the motor.

13. The method of claim 12, wherein when a voltage across the second capacitor is greater than a voltage across the first capacitor, the driving voltage not including the DC offset voltage is applied in a time section of a direction of a first current flowing from the second node to the first node.

\* \* \* \* \*